United States Patent [19]

Luneau

[11] E Patent Number: Re. 32,857

[45] Reissued Date of Patent: Feb. 7, 1989

[54] BRUSHLESS TACHOMETER/SYNCHRO

[75] Inventor: John R. Luneau, Center Harbor, N.H.

[73] Assignee: Resolvex Corporation, Center Harbor, N.H.

[21] Appl. No.: 48,959

[22] Filed: May 12, 1987

Related U.S. Patent Documents

Reissue of:

[64] Patent No.: 4,605,889
Issued: Aug. 12, 1986
Appl. No.: 642,992
Filed: Aug. 21, 1984

[51] Int. Cl.[4] ..... H02P 9/14; G01P 3/46

[52] U.S. Cl. ..... 322/61; 324/163

[58] Field of Search ..... 322/31, 44, 45, 46, 322/47, 49–52, 61, 86–88, DIG. 2; 310/152, 154, 155, 156, 168, 171; 324/163, 164, 166, 208

[56] References Cited

U.S. PATENT DOCUMENTS

| | | | |
|---|---|---|---|
| 2,516,114 | 7/1950 | Green | 324/163 X |
| 4,088,943 | 5/1978 | Schmidt | 324/163 X |
| 4,228,396 | 10/1980 | Polombo | 324/163 |
| 4,364,005 | 12/1982 | Kohzai et al. | 322/DIG. 5 |
| 4,605,889 | 8/1986 | Luneau | 322/61 |
| 4,659,953 | 4/1987 | Luneau | 310/311 |

FOREIGN PATENT DOCUMENTS

| | | |
|---|---|---|
| 9102 | 4/1980 | European Pat. Off. . |
| 2148454 | 3/1973 | France . |

*Primary Examiner*—W. B. Perkey
*Attorney, Agent, or Firm*—Body, Vickers & Daniels

[57] ABSTRACT

A generator providing both tachometer and synchro outputs and comprising a magnetic stator and a corresponding armature structure. The generator stator structure produces a composite magnetic field of both constant (DC) and alternating (AC) flux. The rotor directs the composite flux field through a plurality of sensing coils, each producing a signal from the sensed composite magnetic field and rotor motion, and which coil signal is separated into separate signal components. The components are processed to produce a synchro output which preferrably has standard Hall-effect equivalent signals, as well as providing a tachometer output voltage proportional to the rotor rotational velocity and direction.

13 Claims, 5 Drawing Sheets

BRUSHLESS TACHOMETER/SYNCHRO

Matter enclosed in heavy brackets [ ] appears in the original patent but forms no part of this reissue specification; matter printed in italics indicates the additions made by reissue.

FIELD OF THE INVENTION

The present invention relates to magnetic position and/or velocity sensing devices, and in particular to tachometer generators and synchros.

BACKGROUND OF THE INVENTION

The position and control of rotational machinery typically requires monitoring both the rotational position as well as the rotational velocity. These measurements are usually provided by separate tachometers and synchro sensing elements. The connection of multiple-shaft monitoring devices requires complex and failure-prone mechanical assemblies, which of course increase cost and difficulty of installation while reducing reliability.

Furthermore, tachometers and synchros typically comprise a rotatable armature having electrical signals produced by or required for energization of the armature. The electrical signals on the armature must be transferred by an electrical or a mechanical means, such as slip rings or a transformer assembly. This additional structure further decreases reliability and increases costs.

SUMMARY OF THE INVENTION

The generator according to the present invention provides both a tachometer output signal proportional to the rotational velocity and direction, and a synchro output signal in a single structure. The generator further requires no electrical or mechanical transfer or signals either to or from the rotor or armature element. The resulting apparatus provides substantial improvement in cost, size, and reliability of the entire generator apparatus.

The generator of the present invention comprises a passive magnetic armature rotatable within a circumferential stator element, which includes both the magnetic exciter elements and the magnetic sense windings wound in orthogonal relationship thereon. Furthermore, the sense windings comprise a plurality of windings arranged in a polyphase spacing, and the stator is energized to produce a DC and a high frequency AC flux field. The sense windings produce a high frequency AC synchro output signal, the phase of which, relative to the frequency at which the stator elements are excited, corresponds to the angular displacement of the rotor within the stator assembly. The phase information is digitally detected and in the preferred embodiment, decoded to provide standard open collector Hall-effect output signals. Alternately, the synchro output signal may be encoded to other signal formats, as desired. Moreover, the detected phase signals are logically combined to provide a commutation signal, whereupon velocity components of the sense winding signals, after separation from the synchro signals, are serially selected to produce a continuous tachometer voltage corresponding to the shaft angular velocity and direction.

In one embodiment, the magnetic excitation is provided by a combination of a permanent magnet for the DC field, and an electromagnet for the high frequency AC field, wound circumferentially around a toroidal or annular magnet structure of rectangular cross-section. The annular structure comprises a plurality of radially inward directed pole elements. The pole elements comprise at least two magnetic planes of opposite polarity within the annular structure, wherein each plane of the radial pole elements have a common or uniform magnetic polarity. Different magnetic polarity of each radial pole element is observed in the axial direction of the annular magnet structure. The magnetic structure is therefore excited at a high-frequency rate, as well as with the constant field of the permanent magnet. The plurality of sense windings surrounding the pole pieces, produce composite sense signals wherein each composite sense signal includes a high-frequency component at the excitation frequency, and a component corresponding directly to the rotor motion through the constant magnetic of the DC or permanent magnet. The components are separated and processed by appropriate signal conditioning networks to produce the respective tachometer and synchro output signals.

BRIEF DESCRIPTION OF THE DRAWING

These and other features of the present embodiment can be better understood by reading the following detailed description, taken together with the drawing, wherein.

DETAILED DESCRIPTION OF THE INVENTION

Figure 1:
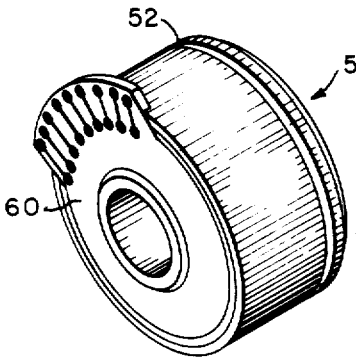
FIG. 1 is a perspective view of the apparatus according to the present invention.
Figure 2:
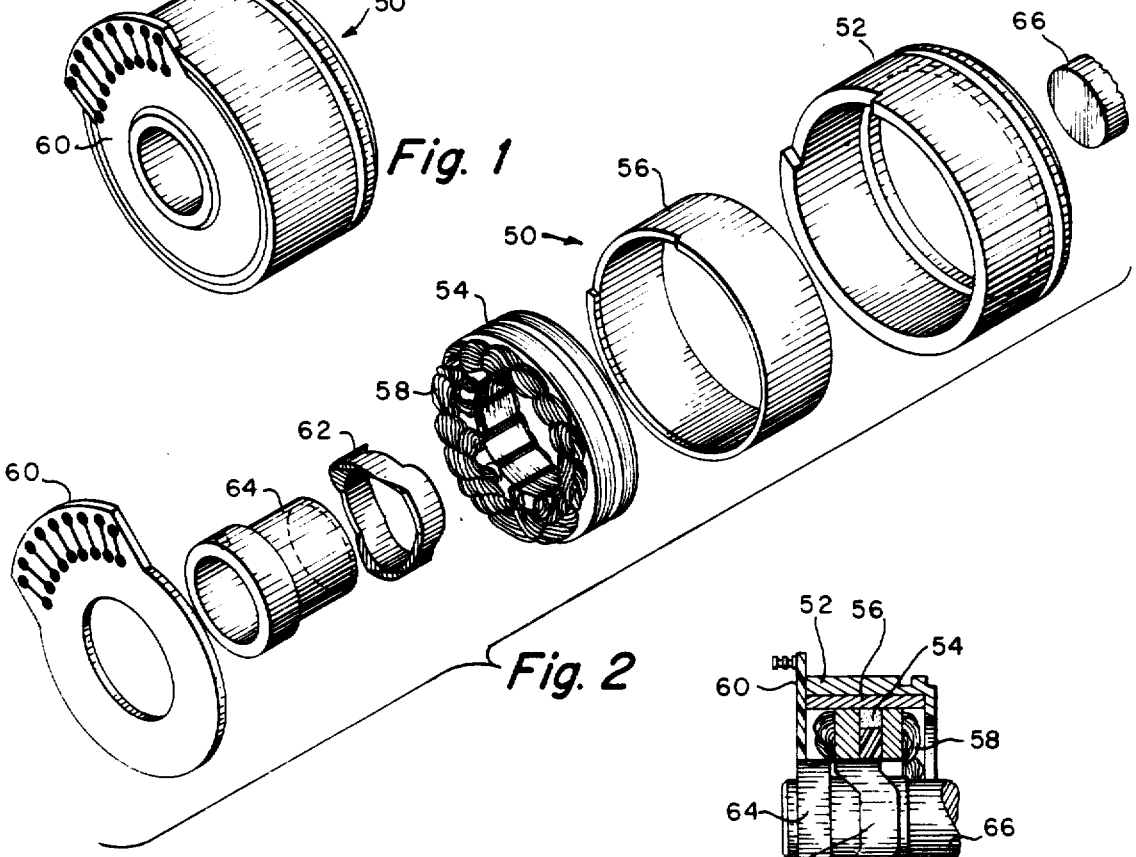
FIG. 2 is an exploded view of the apparatus of FIG. 1.
Figure 3:
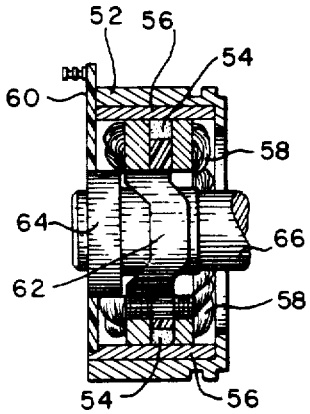
FIG. 3 is a cross-sectional view of the apparatus of FIG. 1.

The combination tachometer/synchro 50 is shown in perspective in FIG. 1 in exploded view in FIG. 2, and in a cutaway view of FIG. 3, showing the synchro mounting feature which facilitates setting the phase relationship with the associated brushless DC motor. The housing 52 encloses the elements which include a magnetic stator structure 54 and a circumferential cylinder 56 of magnetic material. The leads of the stator 54 windings 58 are attached to a terminal plate 60 retained by the housing 52. A rotor 62 of a particular design, discussed below, is rotatable within the armature 54, and is connected to the equipment shaft 66 by bushing 64.

Figure 4A:
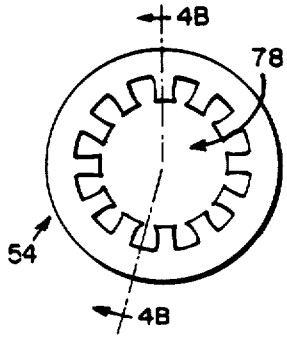
FIG. 4A is an axial view the stator structure.
Figure 4B:
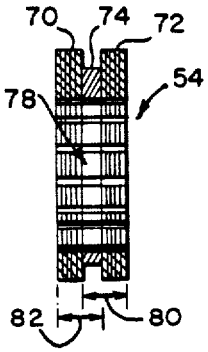
FIG. 4B is a cross-sectional view of the stator magnetic assembly structure.

The stator assembly 54 is shown in greater detail in FIGS. 4A and 4B. The stator assembly 54 comprises two layers of planar magnetic material 70 and 72 separated by a nonmagnetic spacing material 74. The dimensions of the elements are chosen to provide the desired flux concentration, flux path, and leakage paths as desired. The stator assembly 54 comprises a plurality of radially inward directed pole pieces 76, wherein each pole piece 76 of each layer 70 and 72 are overlaying in substantial axial alignment, to permit electrical windings to extend therebetween. The central area 78 is dimensioned to receive the rotor 62, discussed below.

Figure 5B:
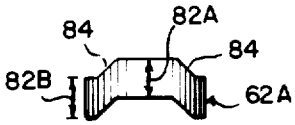
FIG. 5B is a side view of the rotor in a first position.
Figure 5A:
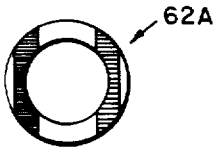
FIG. 5A is an axial view of the rotor in a first position.
Figure 5C:
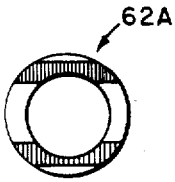
FIG. 5C is an axial view of the rotor in a second position.
Figure 5D:
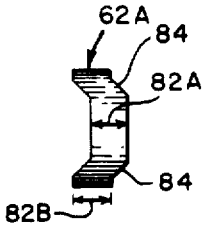
FIG. 5D is a side view of the rotor in a second view.

One embodiment of the rotor 62A, according to one embodiment of the present invention, is shown in FIGS. 5A–5D. The axial view of the rotor is shown in FIGS. 5A and 5C, representing the rotor in two orthogonal rotational positions. The corresponding side views of the rotors are shown in FIGS. 5B and 5D, providing the profile of the rotor 62A. According to the present invention, the dimensions 80 and 82 shown in FIG. 2 correspond to the rotor axial dimensions 82A and 82B, whereupon the rotor 62A, when axially rotated within the stator as shown in FIG. 3, alternately substantially confront either the first layer 70 or the second layer 72 of the two-layer magnetic assembly 54. The transition region 84 comprises a circumferential distance equal to the distance between the pole pieces 76, to provide a desired magnetic skew of one pole piece pitch with a helical transition.

Figure 6:
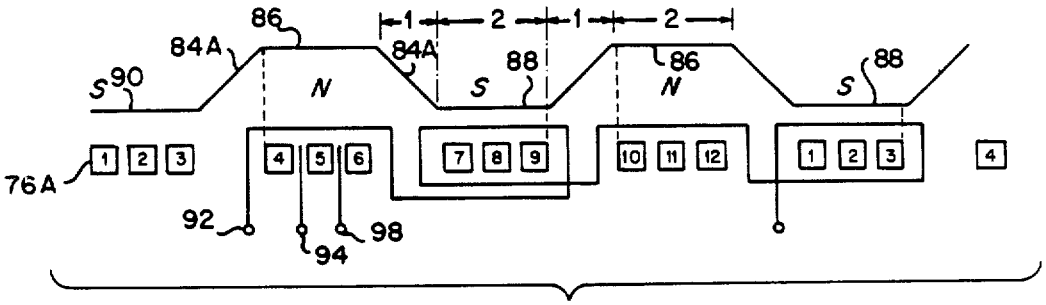
FIG. 6 is a schematic representation of the magnetic structure, one phase of the sensor winding, and rotor surface profile according to the present invention.
Figure 8:
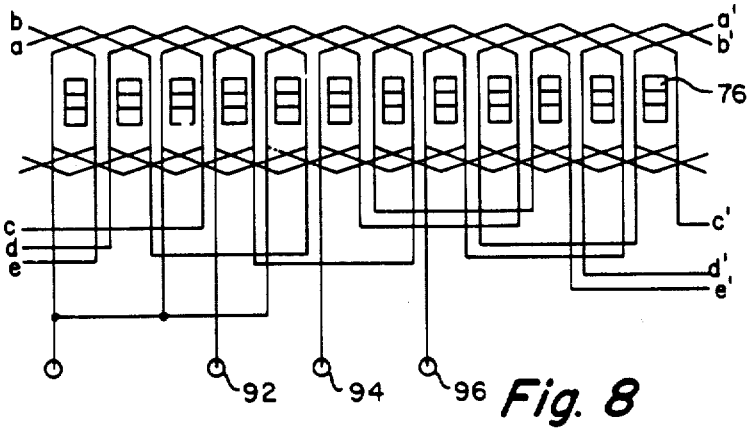
FIG. 8 is a three-phase winding diagram.

A further representation between the profile of the core 62 and the magnetic stator 54 is shown in FIG. 6. The profile 90, representing the coupling of the magnetic field to the pole pieces 76A, show the relative spacing and the corresponding variation at magnetic field provided. The transitions or skew region 84 corresponds to a signle pole piece spacing between adjacent poles, and a period of constant rotor profile, and corresponding constantly increasing magnetic field 86 and 88 are shown as having a duration of two pole piece intervals. The magnetic pole piece representations 76 and 76A are numbered sequentially 1–12 to demonstrate the correspondence between this linear representation and the actual annular or toroidal structure of rectangular cross-section of FIG. 4A. Also shown in FIG. 6 is a single phase of one of the three sensor windings, showing the alternating directions, to provide the desired sensed field signals. Typically, each phase winding 92, grouped together in offset groups of three, with winding 94 and 96 proceeds alternately in a clockwise and counterclockwise direction above the pole pieces, to provide additive polarity of the induced flux changes. The remaining phase sense windings 94 and 96 maintain the winding pattern as shown by sense winding 92, but are offset by an additional single pole piece, as shown in FIG. 8.

Figure 7:
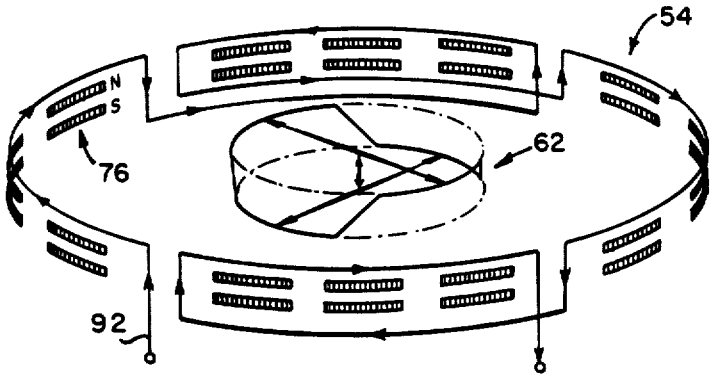
FIG. 7 is a schematic drawing, partially in perspective, showing one phase of the sensor windings, magnetic structure, and rotor assembly in physical relationship.

A simplified representation of the above-discussed rotor 62, stator 54, pole pieces 76, and single-phase winding 92 is shown in FIG. 7. A complete winding diagram of the tachometer/synchro according to the present invention is shown in FIG. 8, showing the three-phase windings 92, 94, and 96, together with the 12 pole pieces 76.

Figure 10:
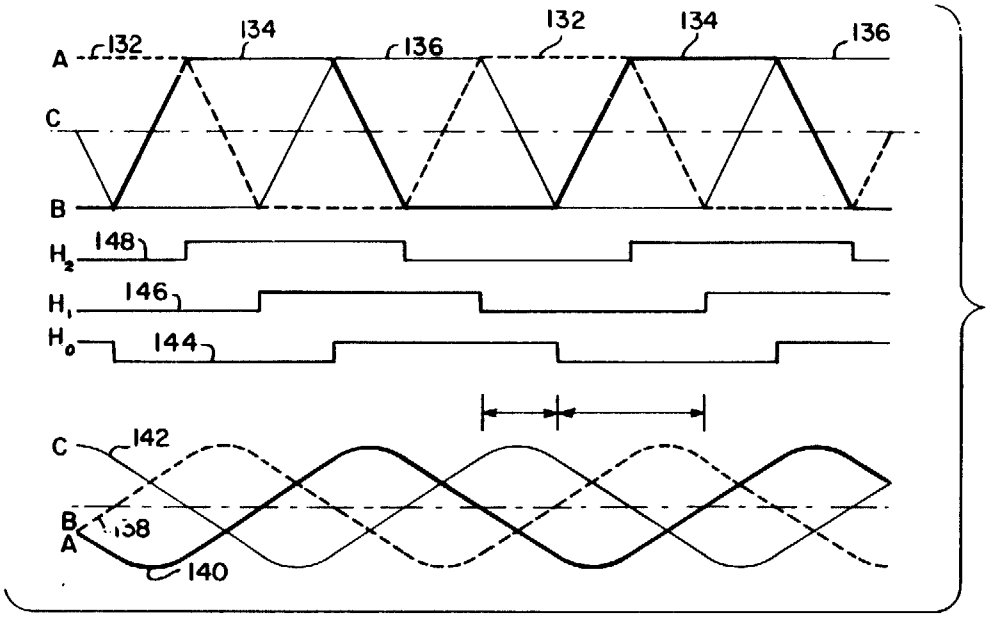
FIG. 10 is a family of voltage waveforms corresponding to signals of FIG. 9.
Figure 9:
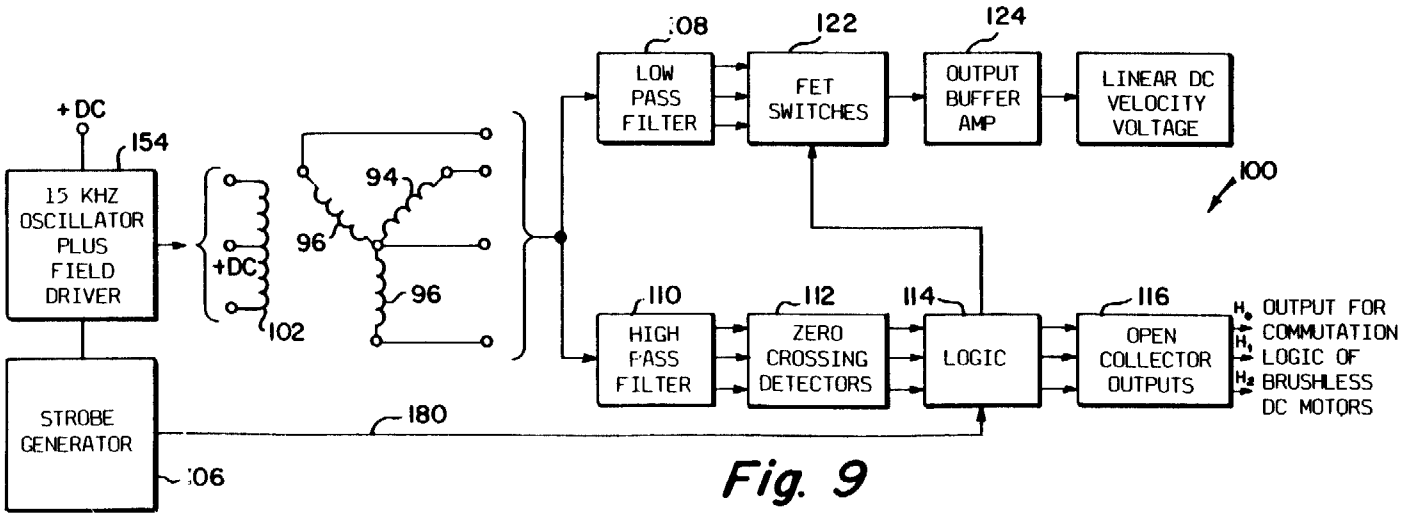
FIG. 9 is a block diagram of the tachometer/synchro according to the present invention.

The block diagram 100 of the system according to the present invention is shown in FIG. 9 and related signal waveforms are shown in FIG. 10. The field coil 102 is wound about the stator assembly 54, surrounding the nonmagnetic space material 74, and residing between the magnetic layer 72 and 70, oppositely magnetically energize the pole pieces to thereby form complementary north and south poles within each and every pole piece 76. The field exciting winding 102 receives a composite signal, including both an alternating and a DC signal from an oscillator and field driver element 104, or preferably as discussed with reference to FIG. 12, an alternating field alone, also providing a strobe signal and lead 180 from the strobe generator 106, for use in subsequent synchronous signal decoding, discussed below. A permanent magnet is used for element 56 to provide a constant flux field. The sense windings 92, 94, and 96, and the common (or midpoint), are each connected to a lowpass filter 108 and a highpass filter 110 to separate the detected signal components. According to the present invention, the communication signals $H_0$, $H_1$, and $H_2$ at leads 120 are generated by first removing the low-frequency components by the highpass filter 110, which excludes the signals substantially below the oscillator 104 excitation frequency. The waveforms 138, 140, and 142 are shown for explanation, being the phase-sensitive demodulated product of the high-frequency sense signals and the exciting oscillator (104) frequency, wherein each waveform is representative of the envelope amplitude of the high-frequency sense signal. The phase is represented by either or positive or negative polarity. The signals from the filter 110 are digitized by zero-crossing detector 112 which produce three output signals corresponding to limit the amplitude of each of the three high-frequency sense winding signals. The resulting signals are received by a digital detector and logic element 114, which compares the three signals with the phase of the strobe generator 106 output, producing three separate output signals, each having a binary state indicating whether the detected high-frequency signals are in phase or out of phase with the strobe generator 106 output signal. The resulting output signals are received by a plurality of drive transistors in the driver circuit 116, having an open collector output on each of the line outputs provided. Accordingly, the three output signals have a Hall-effect equivalent output, corresponding to the $H_0$, $H_1$, and $H_2$ output signals show as 114, 146, and 148, respectively, in FIG. 10. Of special interest for this invention is the use of this device on brushless DC motors, comprising a three-phase stator and a permanent magnet rotor. The three Hall-effect outputs from the device of this invention and then usable for signalling the required switching points of the drive amplifier for the brushless DC motor of the same number of poles and phases. This feature eliminates the need for a separate signal transducer otherwise required for that purpose. However, the present invention may also decode or encode the synchro output to any code desired with the appropriate digital logic.

The lowpass filter 108, rejecting the signals at the oscillator 104 frequency, typically 15 KHz, passes substantially only the back EMF signals generated by the sense windings, 92, 94, and 96, while passing through a constant or DC field. According to the present invention, the signals produced by each sensor winding comprises a portion corresponding directly with the rotational velocity through the magnetic field, wherein the duration of the constant signal portion of each of the three sense windings is extended to be contiguous, whereupon a single continuous signal, throughout the rotation of the rotor 62 within the stator 54, is produced by selective commutation of the sense winding signals. The lowpass filter produces three signals from which the period of constant amplitude, shown as sections 132, 134, and 136 in FIG. 10, is chosen by FET switch element 122. The constant velocity related waveform sections 132, 134, and 136 occur twice per revolution in a four-pole configuration as shown for rotor 62. The commutation signals necessary for selection of the constant region of the sense winding signals is provided by the digital logic element 114, discussed above. In particular, the commutation signals are similar to the Hall-effect output signals 120 transitions, discussed below, although with a separate logic. The resulting tachometer voltage, from FET switches 122, is received by a buffer amplifier 124, also including additional lowpass filter to remove additional noise and error signals. As a result, the output signal is a DC voltage corresponding to the rotational velocity of the rotor 62.

Figure 11:
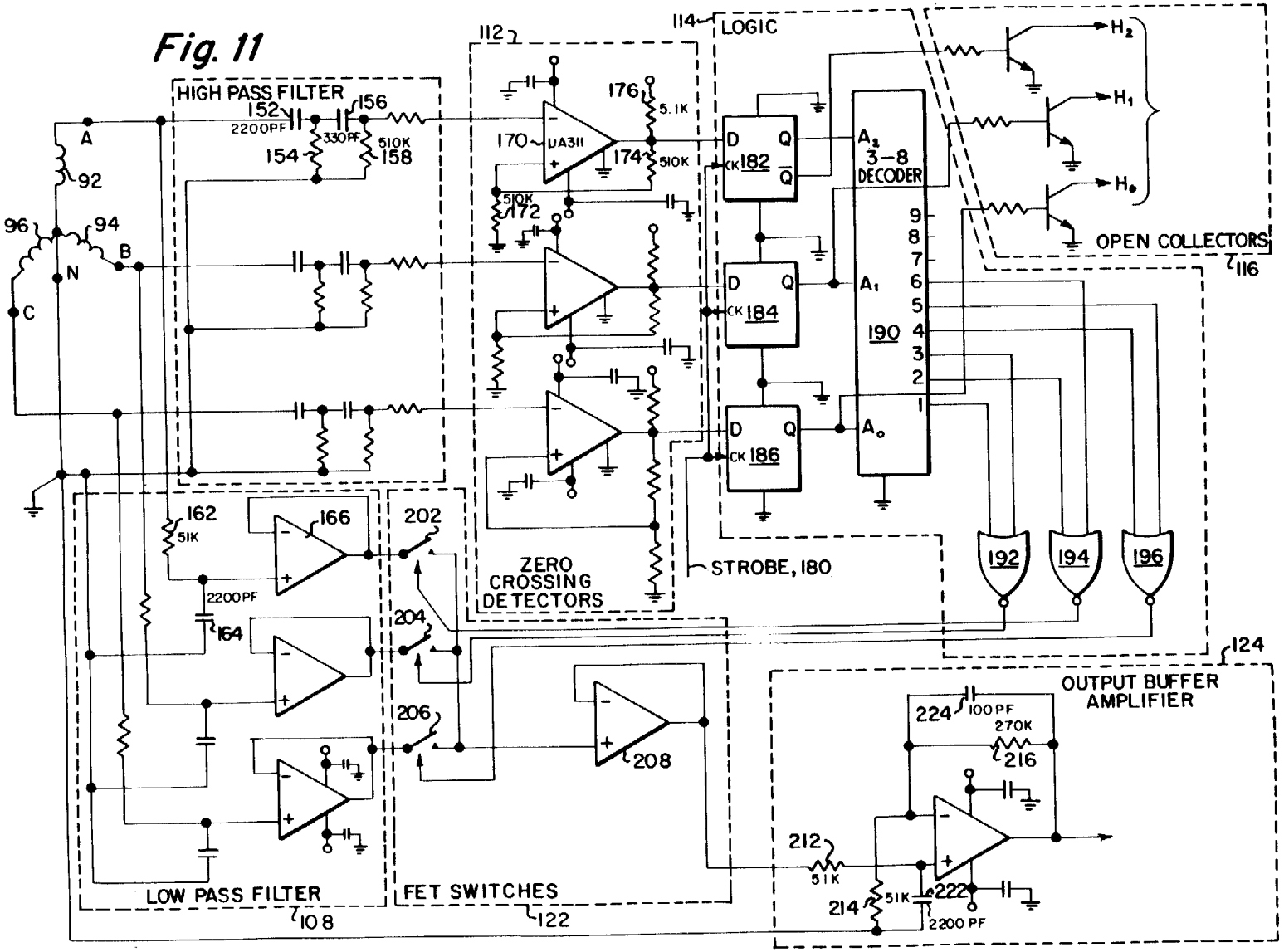
FIGS. 11 and 12 are schematic diagrams showing details of the block elements of FIG. 9.
Figure 12:
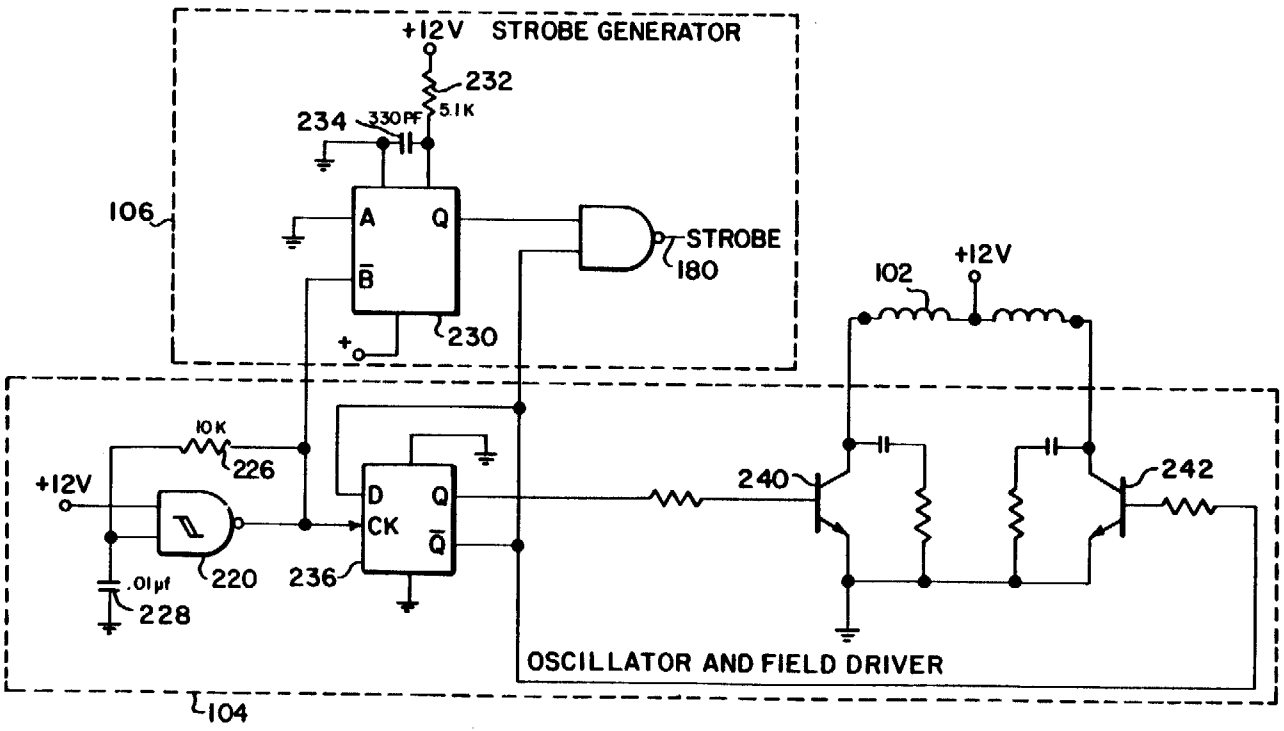

A detailed schematic diagram of the system 100 according to the present invention is shown in FIGS. 11 and 12. The sensor windings 92, 94 and 96 are received by the highpass and lowpass filters 110 and 108, respectively. The highpass and lowpass filter roll-off points coincide, typically being approximately 3 KHz, and the excitation oscillator 104 frequency is typically 15 KHz. The highpass filter comprises a two-pole RC highpass filter, having the elements shown by elements 152, 154, 156, and 158. The filter elements and characteristics are identical for the three sense windings; the remaining two phases are therefore not discussed. Correspondingly, the lowpass filter comprises values exemplified by element 162 and capacitor 164, followed by a voltage follower amplifier 166, forming a single-pole RC lowpass filter. The highpass filter output signals are received by the zero-crossing detector 112, including three =A 311 comparator elements, of several manufacturers, having a slight amount of hysteresis added, as shown by feedlock elements 172, 174, and 176, connected around the comparator 170. The remaining two phases are identical and therefore are not discussed. The binary high-frequency output signals are first digitally synchronously detected by three D-type flip-flops relative to the strobe signal 180, produced by the strobe generator 106, discussed elsewhere, wherein the high-frequency signals from the zero crossing detector 112 are received by the data input, and the strobe signal 180 provides the clock signal. The resulting fip-flop 182, 184, or 186 output states correspond to the relative phase relationship between the strobe signal 180 and each binary high-frequency signal from the zero crossing detector 112. The logic signals produced by flip-flops 182, 184, and 186 are each received by a single open collector driver transistor in the driver section 116, providing the Hall-effect output signals.

The flip-flop 182, 184, and 186 output signals are also received by a 3 to 8 decoder 190, whose outputs are combined by NOR gates 192, 194, and 196. The low-frequency signals from the lowpass filter 108 are selected by the FET switches 202, 204, and 206 in the switch block 122 according to the previously generated commutation signals from the NOR gates 192, 194, and 196, discussed above. The commutation signals therefore select among the sections 132, 134, and 136 of the signals produced by the sense windings 92, 94, and 96, after having the high-frequency components removed by the lowpass filter 108. The resulting selected signals are buffered by amplifier 208, and then received by the output buffer amplifier 124, providing additional gain and lowpass filtering, having the components shown by resistors 212, 214, and 216, as well as capacitors 222 and 224. The resulting output signal is therefore a DC voltage being directly proportional to the rotor 62 rotational velocity.

The field excitation signals are provided by the oscillator field driver 104, shown in further detail in FIG. 12. The oscillator comprises a NAND gate having hysteresis, and feedback shown by elements 226 and 228 which determine the oscillator frequency, typically 15 KHz. The signals are received by a one-shot multivibrator 230, having a pulse output time period determined by resistor 232 and capacitor 234. The output from NAND gate oscillator is received by a flip-flop 236, producing complementary output signals received by driver transistors 240 and 242, driving the energization coil 102. The energization coil 102 can comprise either a single winding with or without a center tap, or a double set of windings and connected in series as shown in FIG. 12. The signal from the flip-flop 136 is also received by a NAND gate to produce the strobe signal 106 as used for synchronous demodulation, discussed above.

In the present embodiment, the field 102 has a push-pull energization, the constant or DC field is provided by an external ferrite magnet in place of the return path element 56, described above. Alternately, a single winding having a single drive transistor may be used wherein the composite field is produced by the AC signal and DC current offset, and the return path element 56 is a magnetic, nonmagnetized material.

These and other embodiments which may be produced by those skilled in the art through modification and substitution of the disclosed system are within the scope of the present invention. Therefore, the present invention is not to be limited, except as claimed.

What is claimed is:

1. A generator, comprising:

means for providing a magnetic field including a constant field and an alternating field having a frequency of alternation;

means for detecting said magnetic field producing a corresponding detected field signal;

an armature for selectively coupling said *magnetic* field according to a physical motion of said armature through a range; and output means receiving said detectede field signal and producing a tachometer output and a position ouptut therefrom.

2. The generator of claim 1, wherein said means for providing a magnetic field includes an oscillator for exciting said means for providing a magnetic field at said frequency of alternation; and said [magnetic] *detected* field signal includes *detected* AC and DC *field* signals corresponding to the constant and said alternating field and the movement of said armature therethrough.

3. The generator of claim 2, wherein said output means includes a phase-sensitive detector receiving said oscillator signal and said detected AC field signals and providing said position output.

4. The generator of claim 3, wherein said position ouptut is a standard Hall-effect equivalent output.

5. The generator of claim 3, wherein said phase-sensitive detector further produces a commutation signal according to the position of said armature relative to said means for providing a magnetic field; and said output means further includes switch means receiving said detected DC field signals and said commutation signal and producing said tachometer output signal.

6. The generator of claim 5, wherein said detected field signal comprises a plurality of signals in phase spacing, wherein through said range, the amplitude of at least one of said [three signals] *plurality of signals in phase spacing* corresponds to the armature motion.

7. The generator of claim 6, wherein said phase spacing are equal phase spacings.

8. The generator of claim 6, wherein said plurality of [detected field] signals *in phase spacing* comprises three signals to provide a three-phase generator.

9. The generator of claim 8, wherein said detected DC field signals from said three signals [from] *form* a contiguous signal being directly proportional to the velocity of said armature motion throughout the range of armature motion; and said switch means selectively combines said three signals to form said tachometer output signal.

*10. The generator of claim 1 wherein said output means further includes (i) means for producing a commutation signal according to the position of said armature relative to said means for providing a magnetic field and (ii) switch means receiving a component of said detected field signal and said commutation signal and producing said tachometer output signal.*

*11. The generator of claim 1 wherein said output means further includes means to separate said detected field signal into a DC signal correlated to said constant field and an AC signal correlated to said alternating field;*

*commutating means receiving said AC signal and generating said position output signal;*

*switch means receiving said position output signal and said DC signal to produce said tachometer output signal.*

*12. A generator comprising*

*a stator;*

*means for providing a magnetic field associated with said stator including a constant field and an alternating field having a frequency of alternation;*

*a brushless rotor movable within said stator to selectively couple said constant field and said alternating field and generate a composite field signal;*

*pickup means associated with said stator to detect said composite field signal;* means to separate said composite field signal into a first and second field signal; and

*output means including commutator means timed by said frequency of alternation and receiving said first field signal to generate a first output signal correlated to the position of said rotor within said stator.*

*13. The generator of claim 12 wherein said first field signal is correlated to said alternating field, said second field signal is correlated to said constant field, said output means further including switch means receiving said second field signal and said first output signal to generate a second output signal, said second output signal correlated to the velocity of said rotor within said stator.*

* * * * *

UNITED STATES PATENT AND TRADEMARK OFFICE

CERTIFICATE OF CORRECTION

PATENT NO. : Re 32,857

DATED : February 7, 1989

INVENTOR(S) : John R. Luneau

It is certified that error appears in the above-identified patent and that said Letters Patent is hereby corrected as shown below:

Column 3, line 24, "2" should read --- 4B ---; line 40, "signle" should read --- single ---. Column 4, line 29, "or" should read --- of ---; line 46, "show" should read --- shown --; "114" should read --- 144 ---. Column 5, line 38, "=" should read ---$\mu$---. Column 6, line 22 (actual), "136" should read --- 236 ---; claim 1, line 10, "detectede" should read --- detected ---; claim 1, lines 11-12, "ouptut" should read --- output---. Column 8, claim 12, lines 11-12, should be printed in italics.

Signed and Sealed this

Twenty-ninth Day of January, 1991

*Attest:*

HARRY F. MANBECK, JR.

*Attesting Officer*

*Commissioner of Patents and Trademarks*